March 21, 1967 W. S. TERRY 3,309,869
COMBUSTIBLE SLOT FORMER FOR SOLID PROPELLANT ROCKET MOTORS
Filed Feb. 23, 1965 4 Sheets-Sheet 1

Walter S. Terry INVENTOR.

BY

ATTORNEY

Walter S. Terry INVENTOR.

BY

ATTORNEY

United States Patent Office 3,309,869
Patented Mar. 21, 1967

3,309,869
COMBUSTIBLE SLOT FORMER FOR SOLID PROPELLANT ROCKET MOTORS
Walter S. Terry, Huntsville, Ala., assignor to Thiokol Chemical Corporation, Bristol, Pa., a corporation of Delaware
Filed Feb. 23, 1965, Ser. No. 434,190
6 Claims. (Cl. 60—39.47)

This invention relates to improvements in combustible cores that are adaptable for use in creating cavities in combustible materials and, more especially, to a combustible slot former that is utilized to create transverse or longitudinal slots in the solid propellant as it is cast into a motor case of a solid propellant rocket motor.

In the early stages of solid propellant rockets, cavities provided in the solid propellant therein were not required to be of complex configurations; and it was a somewhat simple operation to create such cavities. The cores for creating such cavities were usually made of metal that could be easily inserted into the aft end of the motor case and easily withdrawn therefrom without any detrimental effect on the solid propellant that was in contact with the core.

However, as the overall size of the motor case became larger without increase of the aft opening and the cavities in the solid propellant became more complicated because of prevailing ballistic requirements, it became necessary to provide cores that could be collapsed for insertion into the aft opening and then extended into position to meet the configuration of the complex cavity, and then after the solid propellant had been cast into the motor, again collapsed to permit the removal thereof from the solid propellant and final withdrawal thereof through the opening in the aft end of the motor case.

Such operations became hazardous, damage to the solid propellant became frequent, and the need arose, therefore, for a type of core that could be provided to overcome the disadvantages of the then available cores and still be able to provide the cavities that were required to be formed in the solid propellant.

One of the most difficult problems that arose was the provision of transverse or longitudinal slots in the solid propellant that would provide relief of longitudinal or hoop stresses, especially for more severe low-temperature requirements, and, at the same time, enhance the ballistic performance of the solid propellant rocket motor.

Many types of construction were used; but as long as the core forming the slot had to be removed from the solid propellant, detrimental effects on the solid propellant still occurred.

The present type of core or slot former was conceived wherein a solid propellant of the same formulation as that being cast into the motor case or of a formulation having a higher burning rate was used as the material from which the core or slot former was to be made.

Such a core or slot former, which is of hollow construction, could remain in the solid propellant and form the slot that would meet the stress-relieving and ballistic requirements of the solid propellant rocket motor.

The slot former, however, had to be so constructed that the weight of the solid propellant would not cause the collapse of the slot former, thus causing the slot to be destroyed and not meet the requirements that were necessary to meet the stress-relieving and ballistic requirements of the solid propellant rocket motor.

It was an object of this invention, therefore, to provide a hollow slot former made from a solid propellant formulation that would incorporate internal bracings therein that would prevent the overall collapse of the slot former.

The slot former embodying the present invention was provided wherein two circular halves were molded, the halves corresponding to the shape of the conventional pie or cake pans that are provided with a central opening therein and providing in each of the halves radially-disposed reinforcing webs or ribs that exceeded in height the depth of the halves so that, when the halves were positioned in superimposed relation to each other, the webs or ribs would extend between the outer horizontal walls of the halves and thus support such walls from collapsing as the solid propellant is cast into the motor case.

Basically, therefore, the slot former is hollow, with the radially-disposed webs or ribs providing sufficient compressive strength to resist the collapse thereof when subjected to the hydrostatic head of the solid propellant as it is cast into the motor case.

The slot former would be formed of cured solid propellant, and the propellant cast into the motor case would be raw or uncured solid propellant. But the stress-free region surrounding the slot would permit adequate bonding between the slot former and the uncured propellant so that no voids or separations would occur between the slot former and the uncured solid propellant during the curing process of the latter solid propellant.

The use of such a slot former would, therefore, eliminate the necessity of removing it from the solid propellant rocket motor; ignition characteristics could be improved by pre-treatment of the external surfaces of the slot former; the solid propellant used to fabricate the slot former would not require additional expense; and the solid propellant slot former could be readily subjected to the usual quality inspections that are performed on each component of a solid propellant rocket motor before it is accepted for use.

The present invention will, therefore, overcome many of the disadvantages that cover the use of most slot formers and possess many advantages that the inert slot formers do not possess.

Therefore, with the above and other advantages that are inherent with the present invention in view, it comprises the novel details of construction and arrangement of parts which will be more thoroughly discussed and illustrated in the accompanying drawings in which.

Figure 1:
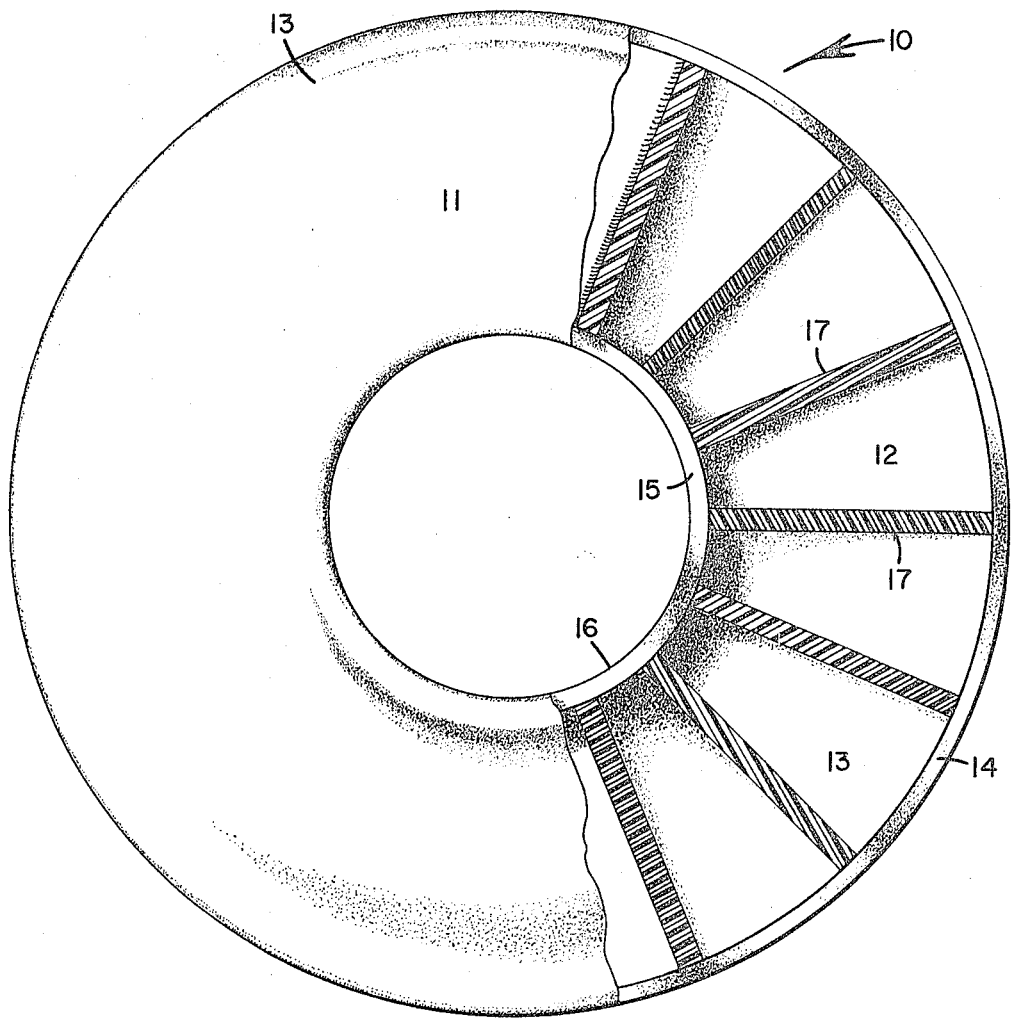
FIGURE 1 is an elevational plan view of a slot former embodying the invention with such view being partly broken away and partly in section to more clearly show the structural details thereof.

Referring more in detail to the drawings wherein like parts are designated by like reference numerals, the reference numeral 10 is used to designate one form of a slot former embodying the invention.

Figure 2A:
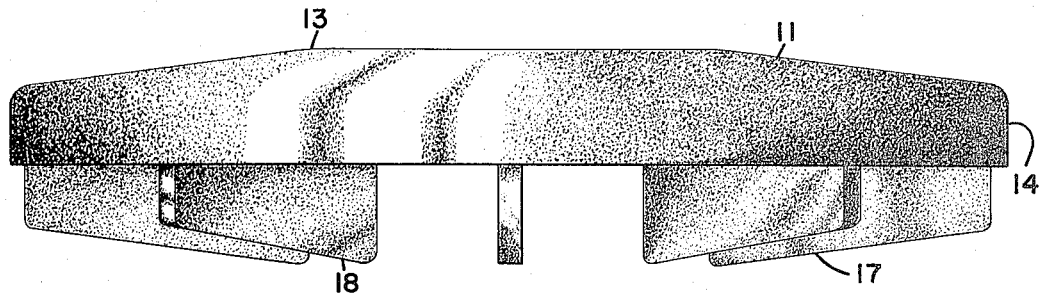
FIGURE 2A is an elevational view of the upper half of the slot former of FIGURE 2.
Figure 2:
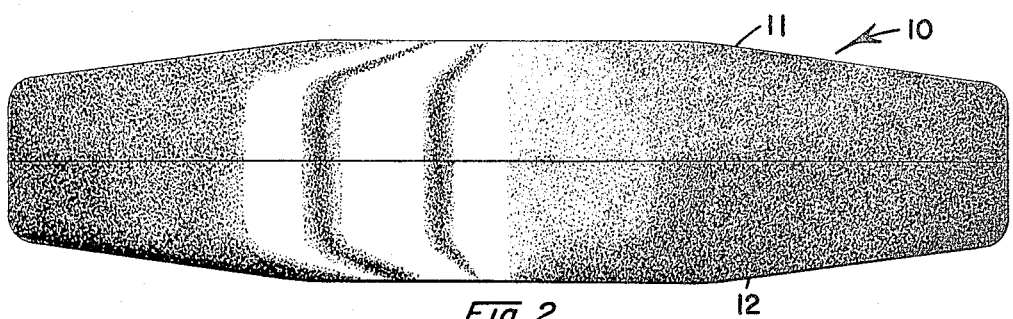
FIGURE 2 is an elevational view of the complete slot former of FIGURE 1 as it is positioned in the motor case.
Figure 3:
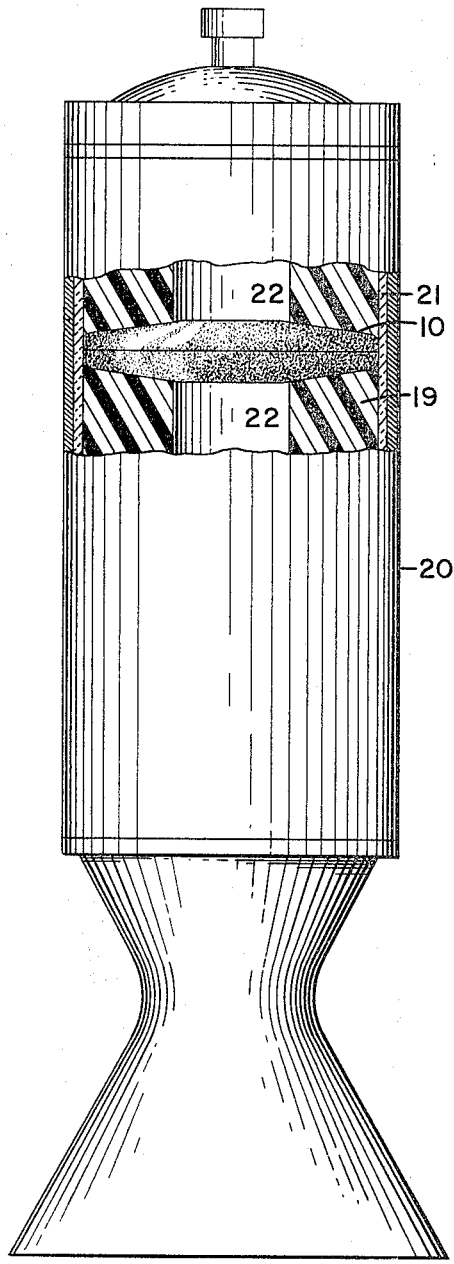
FIGURE 3 is an elevational view of a solid propellant rocket motor broken away to show in section and in elevation the manner in which the slot former is positioned therein in relation to the solid propellant that is cast into the rocket motor.

Referring more particularly to FIGURES 1 to 3, the slot former 10 is shown to comprise a pair of identically-shaped half sections 11 and 12 respectively.

Figure 2B:
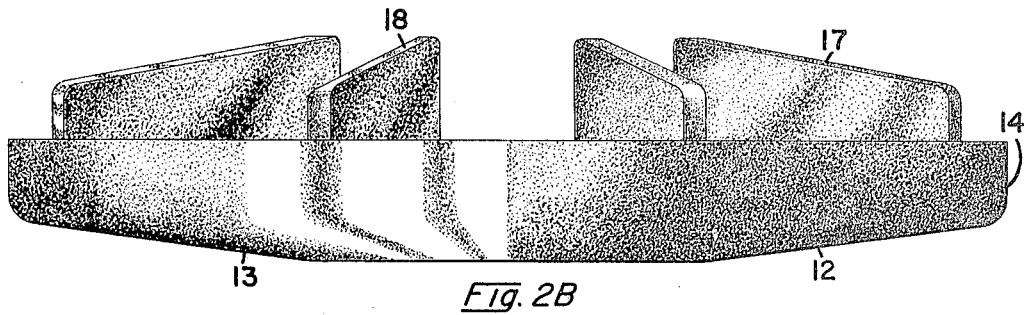
FIGURE 2B is an elevational view of the lower half of the slot former of FIGURE 2.

In forming the half sections 11 and 12, a propellant formulation in its uncured state is cast into a mold. Then a core is pressed into the propellant formulation to form each of the half sections 11 and 12. This results in each of the sections 11 and 12 having a plane surface 13 which may be termed either a top or bottom plane surface depending upon the manner in which the half sections 11 and 12 are positioned, as shown in FIGURES 2A and 2B. The plane surface has an outer peripheral rim 14 and an inner peripheral rim 15 forming a central core receiving opening 16. It will be noted from FIGURE 2 that the slot former, as to the outer surface of the plane surface 13, inclines downwardly and outwardly from the rim 15 towards the rim 14. When the core is pressed into the propellant formulation, ribs or webs 17 are formed and they are twice as high as the rims 14 and 15, extend from rim 14 to rim 15 and are integral with the inner surface of the plane surface 13 and the rims 14 and 15. The ribs or webs 17 extend upwardly from the inner surface of the plane surface 13 at right angles thereto, and the outer longitudinal edges 18 of the ribs or webs 17 are inclined to conform to the inclination of the plane surface 13. Thus, when the half sections 11 and 12 are positioned, as shown in FIGURE 2, the edges of the rims 14 and 15 are in engagement with each other and the half sections 11 and 12 are positioned so that the ribs or webs 17 of these sections are alternately positioned so that the outer longitudinal edges 18 thereof engage the inner surfaces of the half sections 11 and 12. Thus, the ribs or webs 17 support the plane surfaces and prevent the collapse thereof when solid propellant 19 is cast into a rocket motor case 20, as shown in FIGURE 3.

Referring to FIGURE 3, it will be seen that the rocket motor case 20 is of conventional design having an isulation 21 bonded to the inner surface thereof; and in utilizing the slot former 10, a cylindrical core, not shown, that provides the cavity 22 in the rocket motor 20 is inserted therein. A portion of the solid propellant is cast into the rocket motor case 20, and then the slot former 10 is positioned in the rocket motor case 20. At this time, the propellant from which the slot former has been formed is in a cured state; and the contacting edges of the rims 14 and 15 of the slot former have had applied thereto a suitable adhesive bonding agent or any other available propellant repair material. The free edges 18 of the ribs or webs 17 do not have the bonding agent applied thereto so that the slot former 10 may expand and then return to normal shape, thus providing a free-expanding slot in the completed rocket motor. After the slot former 10 is in position, the remainder of the solid propellant 19 is cast into the rocket motor case 20. The rocket motor case 20 is then placed in a curing oven and the solid propellant 19 is cured. During the curing process, the solid propellant at the interfaces of the slot former and solid propellant will become bonded to each other. Thus, no voids or separations will occur between the interfaces of the solid propellant 19 and the slot former 10.

Figure 4:
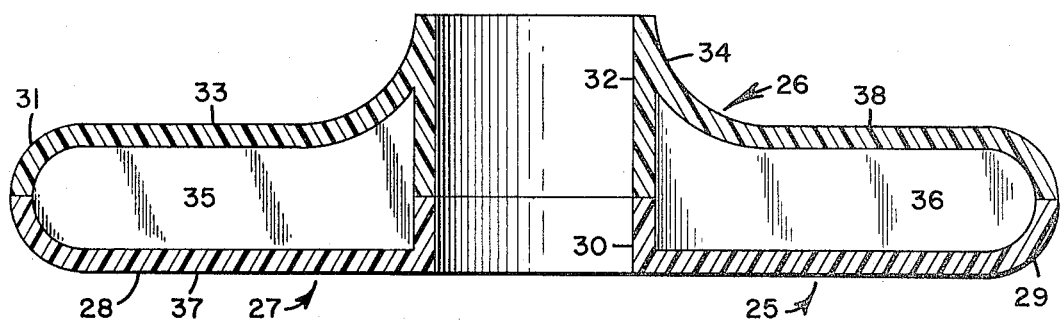
FIGURE 4 is a transverse sectional view of one modified form of the slot former embodying the invention.

In FIGURE 4, there is shown a modified form of slot former 25 that comprises half sections 26 and 27 respectively. In this instance, however, the bottom half section 27 has a flat plane surface 28 that is provided with a curved outer peripheral rim 29 and a right-angularly-disposed inner peripheral rim 30. The upper half section also has a curved outer peripheral rim 31, but the inner peripheral rim 32 is formed so that the plane surface 33 of the upper half section 26 curves upwardly at 34 to provide a fixed curved cavity in the solid propellant as it is cast into the rocket motor case. Also, the ribs or webs 35 and 36 are integral alternately with the plane surfaces 28 and 33 of the half sections 26 and 27 so that the upper longitudinal edges of the ribs or webs 35 and 36 conform as at 37 with the inner surface of the plane surface 28 or as at 38 with the inner surface of the plane surface 33.

There are some ballistic advantages in the design of the rocket motor for the removal of the inner rims of the slot formers shown in FIGURES 1 to 3 and 4; and provisions have to be made to remove the inner rims by cutting with the appropriate tools. It has been found that tools such as described in co-pending application Ser. No. 337,249 are highly suitable for this cutting requirement. It is also advisable to paint the outer surface of the rims with various colors so that the operator can be sure he is cutting the required amount of the slot former when such cutting operation is advisable.

Figure 5:
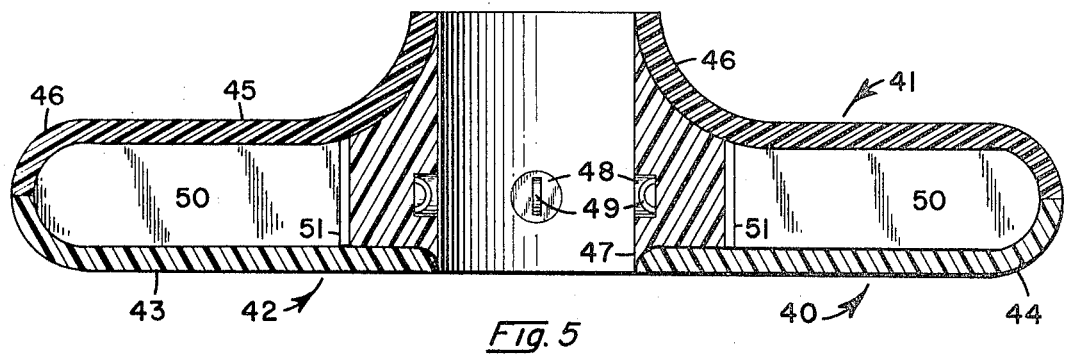
FIGURE 5 is a similar view to FIGURE 4 showing another modified form of the slot former embodying the invention.

In FIGURE 5, there is shown a form of slot former 40 that is similar in outward appearance to the slot former 25 of FIGURE 4 having a pair of half sections 41 and 42 respectively. The bottom half section 42 has a plane surface 43 with an outer curved peripheral rim 44 but no inner peripheral rim. The top half section 41 has a plane surface 45 with an outer peripheral rim 46 and the plane surface 41 is curved upwardly at 46 in the same manner as the slot former 25 is curved upwardly at 34.

There is no inner rim in either half section, but a ring 47 that may or may not be cut into sections is inserted between the half sections 41 and 42 after the outer rims have been bonded together to provide the inner peripheral rims for these sections. The ring 47 may be made of "Teflon" or other suitable materials; and the area contacting the core is provided with a plurality of cavities 48 in which are provided looped fasteners 49 whereby a hooked tool may be extended into the cavity in the rocket motor case to engage the fasteners 49 to pull the ring 47 outwardly of the rocket motor case. Each of the half sections have webs or ribs 50 formed integral therewith, as previously described, and the outer surfaces of the webs or ribs 50 are contoured to conform with the inner surfaces of the plane surfaces with which they come into contact. The webs or ribs 50 are foreshortened at their inner edges 51 to permit the ring 47 to be inserted into place as in FIGURE 5. Once the ring 47 is inserted in place and is contacted by the core, the core will prevent the ring 47 from becoming dislodged until it is purposely removed as previously set forth.

It is also possible to cut the half sections into one fourth sections by vertical cuts and provide radial rims for the sealing of such cuts to permit easier insertion of the sections where the rocket motor case is of substantial diameter with relation to the nozzle opening diameter.

As previously stated, the slot formers are formed from propellant formulations, and such formulation may be the same as the solid propellant cast into the rocket motor case or the propellant formulation may be a high energy formulation that improves the ballistic characteristics of the solid propellant rocket motor.

In all instances, the slot former is bonded to the solid propellant that is cast into the rocket motor case, and permanent bonds are achieved to prevent voids or separations between the interfaces, as previously described.

The slot formers are all inserted into rocket motor case, as previously discussed and are left in the rocket motor case to relieve stresses and provide for the ballistic characteristics of the solid propellant rocket motor. Thus, the time that is consumed by removing an inert slot former from the solid propellant is eliminated and the contamination or damage that may occur to the solid propellant by the use of an inert slot former is also eliminated.

It is believed that the foregoing description will clarify the invention so that its manner of construction, use and advantages will be apparent to those skilled in the art; and it is to be understood that variations in the mode of construction of the invention may be adhered to providing such variations fall within the spirit of the invention and the scope of the appended claims.

Having thus described the invention, what is claimed as new and desired to be secured by Letters Patent is:

1. A combustible slot former comprising a pair of half sections, each of said sections having reinforcing ribs therein whereby when said sections are positioned in superimposed relation to each other said ribs will prevent the collapse of said sections.

2. A combustible slot former, as in claim 1, wherein said slot former comprises a plane surface having a central opening therein and an outer integral peripheral rim and an inner integral peripheral rim outlining said central opening.

3. A combustible slot former, as in claim 1, wherein said ribs are radially disposed and said sections are superimposed on each other so that the ribs of one of said sections will contact the inner surfaces of the superimposed sections.

4. A combustible slot former, as in claim 1, wherein each of said sections is provided with a central opening therein and a removable ring member is positioned in said sections in contiguous relation to the central opening therein.

5. A combustible slot former, as in claim 4, wherein said ring is provided with a plurality of cavities and a looped fastener is positioned in each of said cavities whereby a tool can be used to engage said looped fasteners and remove said ring from said sections.

6. A combustible slot former, as in claim 2, wherein an identifying medium is applied to the outer surface of said inner peripheral rim.

No references cited.

CARLTON R. CROYLE, *Primary Examiner.*